Inventor:
William C. Wootton,
by James B. Tiffany Jr.
Atty.

Aug. 25, 1964 W. C. WOOTTON 3,145,750
SELF-LOCKING STUD HAVING AN OVAL EXPANSION
INSERT SEATED IN A CONTROL BORE
Filed Oct. 16, 1959 3 Sheets-Sheet 2

Inventor:
William C. Wootton,
by James B. Tiffany Jr. Atty.

Aug. 25, 1964 W. C. WOOTTON 3,145,750

SELF-LOCKING STUD HAVING AN OVAL EXPANSION INSERT SEATED IN A CONTROL BORE

Filed Oct. 16, 1959 3 Sheets-Sheet 3

Inventor:
William C. Wootton,
by Walter S. Jones
Atty.

United States Patent Office
3,145,750
Patented Aug. 25, 1964

3,145,750

SELF-LOCKING STUD HAVING AN OVAL EXPANSION INSERT SEATED IN A CENTRAL BORE

William C. Wootton, Fremont, Calif., assignor to United-Carr Incorporated, a corporation of Delaware Filed Oct. 16, 1959, Ser. No. 846,947
3 Claims. (Cl. 151—14)

This invention relates generally to fastening devices and more specifically to a self-locking stud or the like.

The principal object of the invention is to provide a self-locking bolt or the like which will withstand high levels of vibration.

Another object of this invention is to provide a resilient type self-locking bolt or the like which is reusable and due to its resilient feature prevents excessive frictional wear on the threads when the fastener is operated frequently.

Another object of this invention is to provide a self-locking bolt which is universally adapted for various combinations of thread tolerances through a wide range of diameters.

A further object of this invention is to provide a self-locking bolt in which the locking action is independent of the load on the fastener.

Another object of the invention is to provide a self-locking bolt in which there is no deformation of the threads and which is adapted to a wide range of environmental conditions including temperatures of at least 1200° F.

Other objects of the invention will, in part, be obvious, and will, in part, appear hereinafter.

Figures 1, 2, 3, 4, 5, 6, 7, 8:
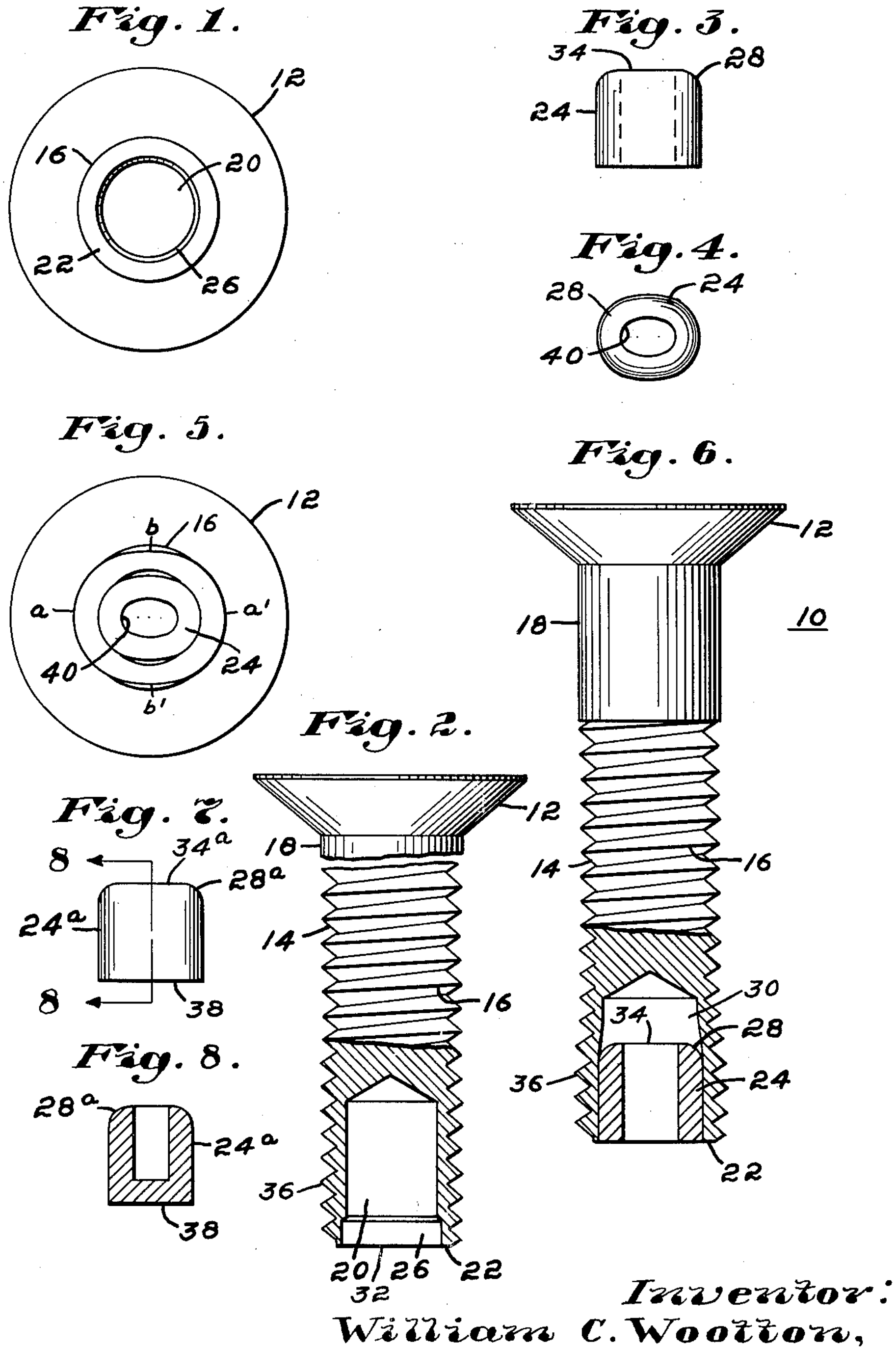
FIG. 1 is a bottom plan view of the bolt member illustrating the aperture adapted to receive the insert.
FIG. 2 is a view in elevation, partly in section of the bolt member.
FIG. 3 is a view in side elevation of the insert.
FIG. 4 is a top plan view of the insert.
FIG. 5 is a bottom plan view of the bolt member with the insert in assembly.
FIG. 6 is a view in side elevation, partly in section, of the self locking bolt having the insert assembled therewith.
FIG. 7 is a view in side elevation of a modified form of the insert.
FIG. 8 is a view in section taken on line 8—8 of FIG. 7.

Referring to the drawings, there is illustrated a conventional bolt member 10 comprising a head 12 at one end and a shank 14. The shank includes an externally threaded portion 16 and an unthreaded portion 18 disposed intermediate the head and threaded portion. A circular opening 20 is formed axially in the end 22 opposite the head 12 extending upwardly into the threaded shank as shown in FIG. 2. Into this opening 20 is fitted a hollow cylinder 24. The opening 20 is of greater depth than the length of the cylinder 24, for purposes hereafter described.

As illustrated in FIGS. 1 and 2, a counterbore 26 is formed adjacent the end 22 which cooperates with the radius 28 of the oval cylinder 24 to enable easy insertion of the insert within the opening 20. As illustrated in FIG. 6, a breathing space 30 is formed intermediate the bottom 32 of the opening 20 and the end 34 of the oval cylinder 24 to allow the flexing of the cylinder 24 against the relatively thinner side walls 36 permitting the formation of the major *a—a'* and *b—b'* axes.

The cylinder 24 is formed of heat-treatable material and preferably has an oval or elliptical configuration as illustrated in FIG. 4 and consists of a continuous peripheral wall 40 surrounding an open area.

To assemble the fastener, the oval cylinder 24 is inserted within the circular opening 20 of the bolt 10 causing the threaded portion adjacent thereto to assume a shape similar to the oval cylinder giving the external threads a major *a—a'* and *b—b'* axes with the major axis slightly larger than the internal diameter of the complementary nut 40. As the bolt enters into threaded engagement with a nut, preferably having a tapered lead, the oval cylinder, being formed of heat-treatable material, with flex and assume a circular shape while continuously exerting pressure on the external threaded portion 36 and in turn the internal threads of the nut developing a resultant locking torque. In the normal formation of threads on the stud, a thread of reduced diameter is formed, allowing sufficient lead to permit the easy entrance of a stud into a nut member.

In FIGS. 7 and 8, there is illustrated a modified version of the oval cylinder 24 where one end 38 of the cylinder is closed and remains substantially round which would result in easier entry into the nut.

Figures 9, 10, 11, 12, 13, 14, 15, 16, 17, 18:
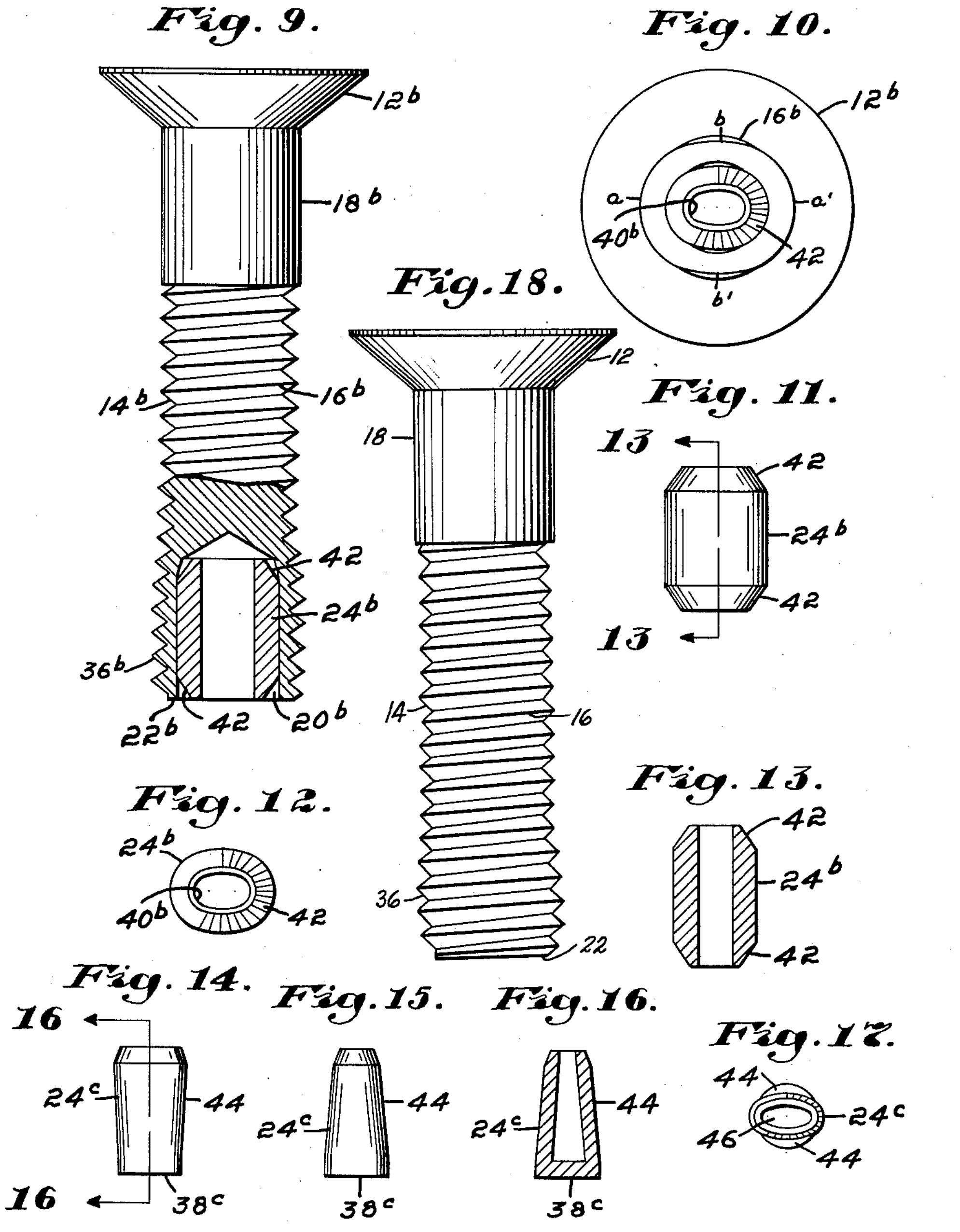
FIG. 9 is a view in side elevation of a modified form of the bolt member and insert partly in section.
FIG. 10 is a bottom plan view of a modified form of the insert and bolt member.
FIG. 11 is a view in side elevation of a modified form of the insert.
FIG. 12 is a top plan view of a modified form of the insert.
FIG. 13 is a view in section taken on line 13—13 of FIG. 11.
FIG. 14 is a view in side elevation of another modified form of the insert member.
FIG. 15 is an end view of the modified form of the insert shown in FIG. 14.
FIG. 16 is a section taken on line 16—16 of FIG. 14.
FIG. 17 is a top plan view of the modified form of the insert.
FIG. 18 is a view of the end threads on the stud illustrating the normal lead.
Figure 19:
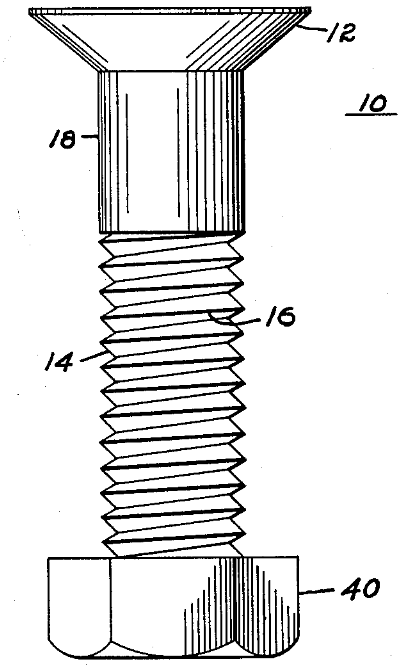
FIG. 19 is a side elevation of the bolt member shown in FIG. 6 engaged with a nut.
Figure 20:
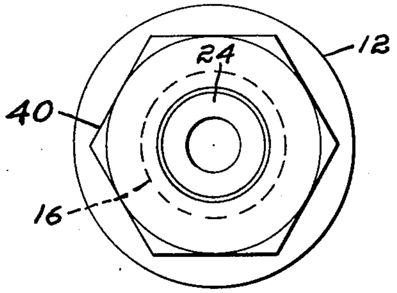
FIG. 20 is a top plan view of the nut and bolt shown in FIG. 19.

In FIGS. 9 through 13, there is illustrated another modification of this invention where the bolt member includes a head **12*b*, an unthreaded shank 18*b* and a threaded portion 16*b*. A circular opening 20*b* is formed axially in the end 22*b* of a depth equivalent to the length of the insert 24*b*. The insert as shown in FIG. 11 is formed of heat-treatable material and preferably has an oval or elliptical configuration but differs from the original form by having a chamfer 42 formed on both ends. This chamfer aids in the assembly of the insert within the opening 20*b*** and eliminates the need for a counterbore or breathing space which may be desirable in some applications.

In FIGS. 14 through 17, there is shown another modification of the insert member where one end **38*c* of the cylinder is closed and is of circular shape. The walls 44 of the cylinder are tapered uniformly toward the other end which has been crimped inwardly on two sides to form an oval open end 46**.

Since certain other obvious modifications may be made in this device without departing from the scope of the invention, it is intended that all matter contained herein be interpreted in an illustrative and not in a limiting sense.

I claim:

1. A self-locking bolt including a threaded shank, said shank having a central bore axially extending thereinto from one end thereof forming a continuous wall portion of reduced thickness, and a resilient insert non-circular in cross-section mounted wholly within said bore whereby said wall portion enveloping said insert is flexed to a configuration generally non-circular in cross-section.

2. A bolt assembly for self-locking engagement with a corresponding female element comprising a threaded shank having an axial bore extending thereinto from one end thereof for a predetermined distance forming a continuous wall portion of reduced thickness, and a resilient, hollow, metal insert elliptical in cross-section positioned wholly within said axial bore, said insert resiliently forcing the area of the bolt enveloping said insert into an elliptical configuration having major and minor axes whereby when the bolt is placed into threaded engagement with said female element, the insert in the area of the bolt enveloping same will flex into a generally circular configuration to firmly lock the bolt and the female element into threaded engagement with one another.

3. A self-locking bolt comprising a head portion, a shank portion integrally secured at one end to one face thereof with at least a portion of said shank from its free end thereof being threaded, a generally circular bore axially extending centrally into said shank portion from the threaded end thereof for a predetermined distance forming a continuous threaded wall portion in said shank portion of reduced thickness, a separate, hollow, resilient insert generally oval in cross-section seated wholly within said bore with the outermost end thereof being at least flush with the free end of said shank portion, said insert deforming the lower threaded portion of said shank portion engaged thereby into a non-circular configuration, with the threaded portion thereof having major and minor axes with the major axis being slightly larger in diameter than the internal threaded diameter of an internally threaded female element to be threadedly engaged therewith whereby when said bolt is threadably engaged with the corresponding threaded female element, said insert will flex permitting the shank portion to assume its normal circular configuration and be placed in a locking torque with said female element by said insert.

References Cited in the file of this patent

UNITED STATES PATENTS

| | | |
|---|---|---|
| 1,050,097 | Boero | Jan. 14, 1913 |
| 1,438,648 | Jacobs | Dec. 12, 1922 |
| 1,780,675 | Hewitt | Nov. 4, 1930 |
| 1,993,996 | Johnson | Mar. 12, 1935 |
| 2,414,870 | Harding | Jan. 28, 1947 |
| 2,536,388 | Murray | Jan. 2, 1951 |
| 2,637,361 | Nagel | May 5, 1953 |